United States Patent [19]

Müller

[11] Patent Number: 4,763,747
[45] Date of Patent: Aug. 16, 1988

[54] ALL WHEEL DRIVE FOR A MOTOR VEHICLE

[75] Inventor: Robert Müller, Mönsheim, Fed. Rep. of Germany

[73] Assignee: Dr. Ing. h.c.F. Porsche Aktiengesellschaft, Fed. Rep. of Germany

[21] Appl. No.: 7,364

[22] Filed: Jan. 27, 1987

[30] Foreign Application Priority Data

Jan. 31, 1986 [DE] Fed. Rep. of Germany ....... 3602930

[51] Int. Cl.⁴ .............................................. B60K 17/34
[52] U.S. Cl. ..................................... 180/244; 74/711;
 74/714; 180/233; 180/245
[58] Field of Search ............... 180/248, 249, 244, 245, 180/233, 250, 197; 74/710.5, 711, 714

[56] References Cited

U.S. PATENT DOCUMENTS

| | | | |
|---|---|---|---|
| 2,159,983 | 5/1939 | Colby | 74/714 |
| 2,837,936 | 6/1958 | Fackler | 74/711 |
| 3,060,765 | 10/1962 | Rinsoz | 74/710.5 |
| 3,343,429 | 9/1967 | Frost | 74/711 |
| 3,374,692 | 3/1968 | Kitch et al. | 74/792 |
| 3,690,426 | 9/1972 | Weisgerber | 74/710.5 |
| 3,738,192 | 6/1973 | Belansky | 74/711 |
| 3,893,351 | 7/1975 | Baremor | 74/710.5 |
| 4,520,691 | 6/1985 | Rodler, Jr. | 74/790 |
| 4,583,424 | 4/1986 | Hiddessen | 74/710.5 |
| 4,665,769 | 5/1987 | Parsons | 74/710.5 |

FOREIGN PATENT DOCUMENTS

| | | |
|---|---|---|
| 3317247 | 11/1984 | Fed. Rep. of Germany . |
| 3427725 | 8/1985 | Fed. Rep. of Germany . |
| 3502524 | 8/1985 | Fed. Rep. of Germany . |
| 3513888 | 10/1985 | Fed. Rep. of Germany . |

Primary Examiner—John J. Love
Assistant Examiner—Everett G. Diederiks, Jr.
Attorney, Agent, or Firm—Barnes & Thornburg

[57] ABSTRACT

A first axle, such as the front axle of a motor vehicle, is directly driven by the vehicle engine or its gear shift transmission. The vehicle wheels of the rear axle can be connected automatically via two limited slip differential systems that are assigned to them and are arranged on the rear axle. The limited slip differential systems comprises a planetary transmission with a through drive ratio that deviates slightly from 1:1 and a centrifugal brake that engages at the planetary transmission with a significantly higher ratio.

9 Claims, 2 Drawing Sheets

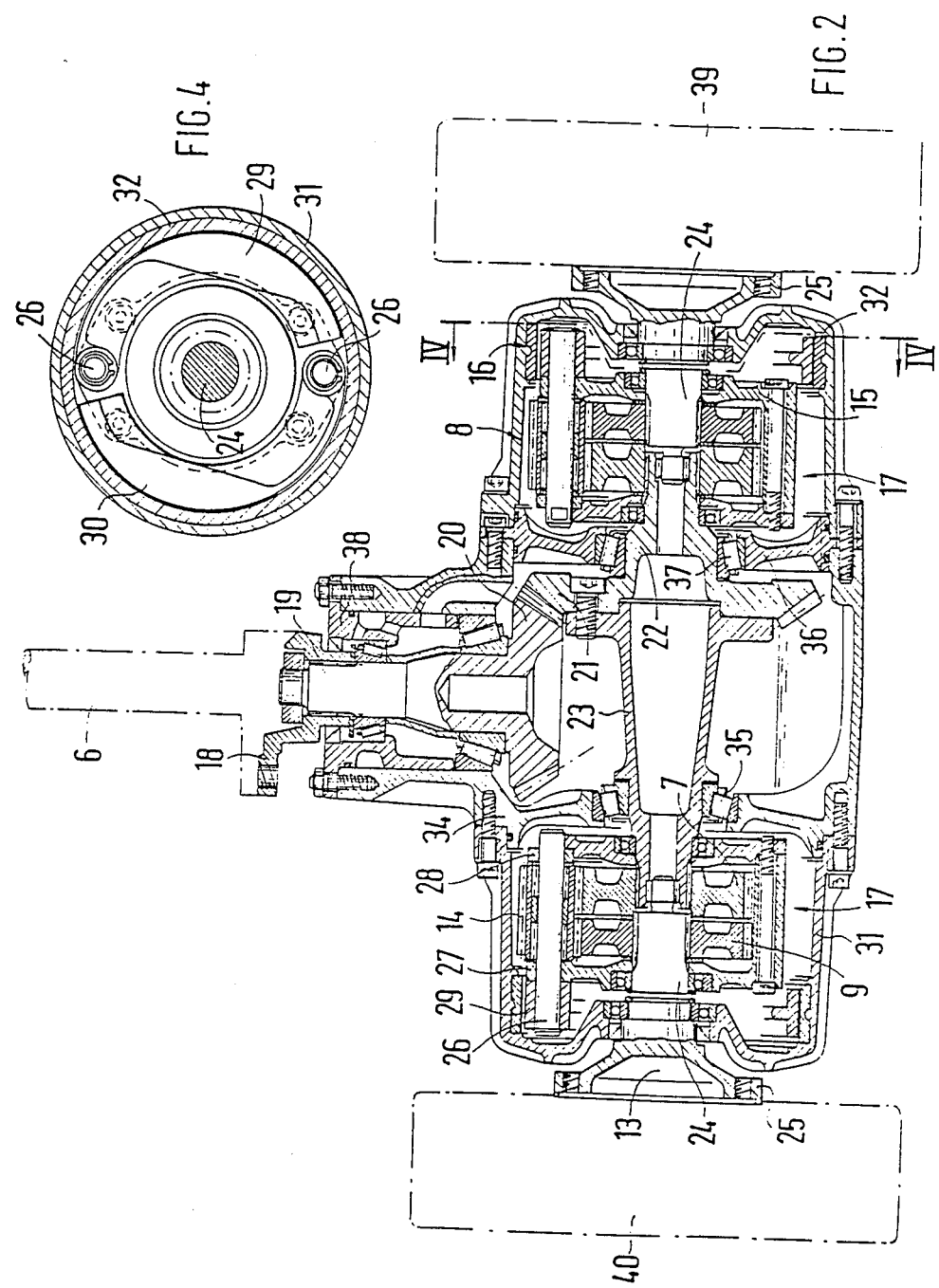

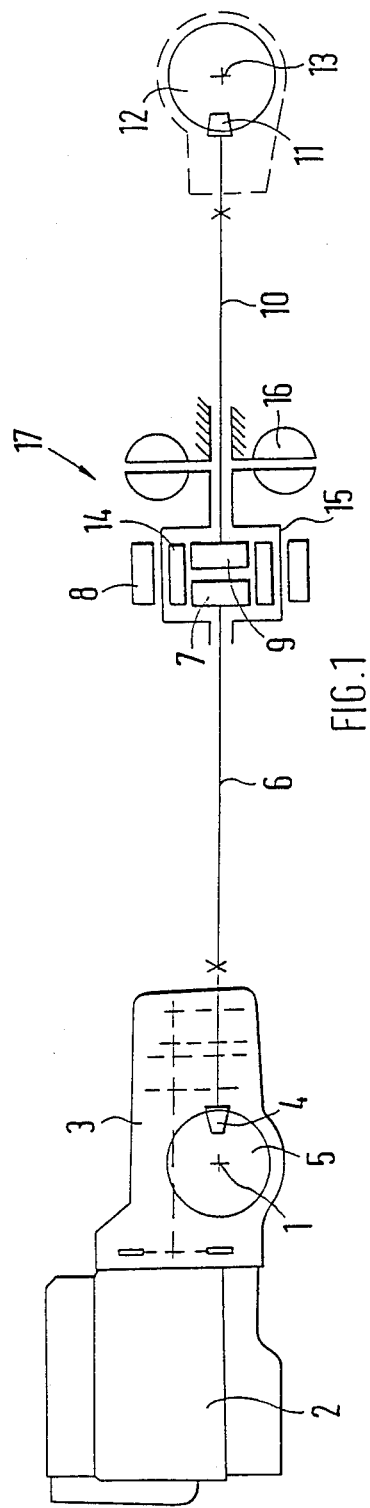
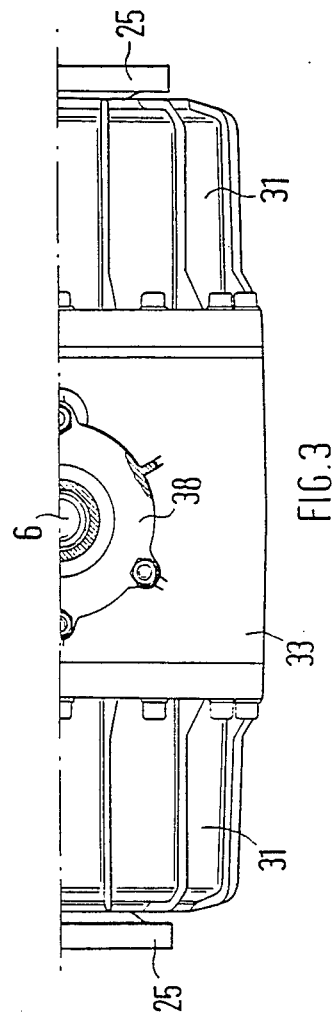

ALL WHEEL DRIVE FOR A MOTOR VEHICLE

BACKGROUND AND SUMMARY OF THE INVENTION

The present invention relates to an all-wheel drive for a motor vehicle, having a first axle that can be driven continuously by the vehicle engine or its gear shift transmission and an automatically operating limited slip differential system. This differential system brings two vehicle wheels of a second axle into driving connection with the first axle. The differential system has a planetary transmission formed of sun gear wheels, planetary wheels and a planetary carrier that has a drive through ratio which only slightly deviates from 1:1. The system also has a braking device which is applied to the planetary transmission at a high ratio.

In an all-wheel drive such as is described in German Patent Application No. P 35 07 490.6, corresponding to commonly-owned U.S. application Ser. No. 835,381, the above type of limited slip differential system is placed in the power train of the front and the rear axle. It has an intermediate planetary transmission in the direct through drive and a braking device that is engageable with the transmission. In order to keep the required braking moment and the braking device small, the transmission ratio of the gear wheel transmission to the braking device is designed to be significantly higher than the transmission ratio for the direct through drive that deviates slightly from 1:1. Optimally, these characteristics are realized by means of a planetary transmission that is known as a Wolfrom transmission.

The Wolfrom transmission has an inlet sun gear wheel and an outlet sun gear wheel that is disposed axially adjacent the inlet sun gear wheel, is connected with the axle to be driven, and has a slightly smaller number of teeth than the inlet sun gear wheel. It also has planetary wheels which mate with the two sun gear wheels, these planetary wheels being disposed at a planetary carrier. A centrifugal braking device is connected with the planetary carrier that becomes effective as soon as the planetary carrier, when there is a speed difference between the driving front axle and the rear axle, is set into rotation. The braking moment of the centrifugal brake rises progressively with the speed difference to cause a torque transmission and thus an automatic joining of the rear axle. The planetary carrier is stopped only when both axles move 100 synchronously, which is practically never achieved. Therefore, an all-wheel drive that has this limited slip differential system may also be called a continuous all-wheel drive.

An objective of the invention therefore is to provide this type of limited slip differential system in the power train of a motor vehicle in such a way that a compact and space-saving construction is made possible and the additional costs resulting from the installation can be reduced to a minimum.

These and other objectives are achieved by the present invention by providing in an all-wheel drive in which the first axle is continuously driven, a limited slip differential system arranged at a second axle for bringing the vehicle wheels on this second axle into driving connection with the first axle. The limited slip differential has a planetary transmission formed by sun gear wheels, planetary wheels and a planetary carrier that has a through drive ratio which only slightly deviates from 1:1, and a braking device that is applied to the planetary transmission at a high ratio. At least one limited slip differential system is arranged at the second axle in direct driving connection with at least one vehicle wheel. If the limited slip differential system is arranged on the axle that is to be joined, for example, in the case of a front-wheel drive motor vehicle, on the rear axle, it can be integrated into the rear axle housing in such a way that a compact and space-saving drive unit is created.

In a preferred embodiment of the present invention, two limited slip differential systems are arranged at the second vehicle axle that can be joined. These limited slip differential systems, in each case, are adjacent to a vehicle wheel and are driven jointly by a central drive shaft extending in longitudinal direction of the vehicle. Thus, the whole axle is not joined, but rather only that vehicle wheel that with respect to the wheels of the other axle exhibits a speed difference is joined. Both limited slip differential systems are rigidly connected with one another and will also be effective if one wheel of the axle exhibits a speed difference with respect to the other wheel. These two limited slip differential systems render a differential gear superfluous and provide, in addition to the all-wheel limited longitudinal slip, a limited transverse slip for the wheels of the axle on which they are mounted. Since a differential gear is not required, the additional cost with respect to a motor vehicle without all-wheel drive is only slight.

The two limited slip differential systems that are identical in their dimensions are arranged symmetrically with respect to the longitudinal axis of the motor vehicle so that their braking devices are each facing one vehicle wheel. The inlet sun gear wheels of their planetary transmissions are driven by central shafts that are flanged together and, via a bevel gear angle drive, are driven jointly by the drive shaft extending in longitudinal direction of the motor vehicle. The longitudinal shaft and the angle drive are housed in a center housing onto which, on both sides, two identically constructed housing caps are flanged in which the limited slip differential systems are housed. The two housing caps, together with the center housing, form a compact axle housing with smoothly blending outer contours, the outer diameter of which may be smaller than in the case of a conventional axle housing since the bevel gear angle drive has smaller dimensions than the previously required differential gear having the ring gear.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration of an all-wheel limited slip differential system used in the invention;

FIG. 1A is a partial schematic view depicting an alternative braking device for use in the system of FIG. 1;

FIG. 1B is a partial schematic view depicting another alternative braking device for use in the system of FIG. 1;

FIG. 1C is a partial schematic view depicting yet another alternative braking device for use in the system of FIG. 1;

FIG. 2 is a longitudinal section of a rear axle housing with the driving system and the limited slip differential system of the present invention;

FIG. 3 is a partial top view of the rear axle housing;

FIG. 4 is a cross-section according to the Line IV—IV of FIG. 2 of the centrifugal brake.

DETAILED DESCRIPTION OF THE DRAWINGS

The method of operation of the all-wheel drive according to the invention will first be explained with reference to FIG. 1. A driving motor 2 arranged on a motor vehicle close to the front axle 1 drives the front axle 1 by means of a gear shift transmission 3 mounted at the motor 2, via a bevel gear 4 and a plate gear wheel 5. From the bevel gear 4, a drive shaft 6 extends to an inlet sun gear wheel 7 of a planetary transmission 8. An outlet sun gear wheel 9 is disposed coaxial to the inlet sun gear wheel 7 and adjacent to it. An output shaft 10 leads from the outlet sun gear wheel 9 to a bevel gear 11 that engages in a plate gear wheel 12 of the rear axle 13.

Planetary wheels 14 engage with the inlet sun gear wheel 7 and the outlet sun gear wheel 9. The planetary wheels 14 are disposed at a planetary carrier 15 that is fixedly connected with the braking member of a braking device 16. This type of planetary transmission 8, in which the inlet sun gear wheel 7 and the outlet sun gear wheel 9 have a slightly different number of teeth and both sun gear wheels 7, 9 engage with a planetary wheel 14, is known as a Wolfrom transmission.

The planetary transmission 8 and the braking device 16, constructed as a centrifugal brake, together form a limited slip differential system 17 that in this illustrated embodiment is installed in the longitudinal power train of the motor vehicle. In this embodiment, the inlet sun gear wheel 7 has 46 teeth; the outlet sun gear wheel 9 has 44 teeth; and each planetary wheel 14 has 14 teeth. In the case of the selected through drive ratio of 44:46, the ratio to the planetary carrier is 22:1; i.e., the rotational speed of the planetary carrier 15 is 22 times higher than the rotational speed difference between the front axle 1 and the rear axle 13. In order to, from a design point of view, make the total ratio of the front axle 1 to the rear axle 15 1:1, the bevel gear plate gear wheel ratios to the front axle 1 and the rear axle 13 are selected reciprocally to the through drive ratio; in the case of the front axle, they are 23:33 and in the case of the rear axle, 33:22. Thus, the product of through drive ratio, ratio to the front axle and ratio to the rear axle 13 then becomes 1:1.

When there is a rotational speed difference between the front axle and the rear axle caused by road conditions, the planetary carrier rotates at 22 times the rotational speed. Since it is fixedly coupled with the braking element of a centrifugal brake 16, this braking element also rotates at the same speed. It is braked corresponding to the progressively rising characteristic line of torque and rotational speed and exercises an identical moment at the planetary carrier 15 that is now available as the supporting moment for the stationary ratio of the Wolfrom transmission and thus for the drive torque transmission to the rear axle 13.

In FIG. 1, a housing H is schematically depicted for the differential system with the brake 16 disposed outside of this housing H. FIGS. 1A, 1B and 1C schematically depict other preferred embodiments of braking devices that could be used in place of braking device 16 of FIG. 1. FIG. 1A schematically depicts an electrical eddy current brake 16A. FIG. 1B schematically depicts a braking device 16B with an externally operated disk D. FIG. 1C schematically depicts a braking device 16B which is a lamella brake.

As an example, FIG. 2 shows a preferred embodiment of the all-wheel drive according to the invention, in which case the components of the limited slip differential system 17 already shown schematically in FIG. 1 have the same reference numbers. A clutch plate 18 that is in driving connection with the front axle 1 is fastened on the journal 19 of the bevel gear 20 by a serration connection. The bevel gear 20 engages in a second bevel gear 21 and together with it forms an angle drive in the direction of the rear axle 13 by means of which the two limited slip differential systems 17 arranged on the right and on the left on the rear axle 13 are driven.

The two limited slip differential systems 17 are constructed and dimensioned identically and are installed symmetrically to the longitudinal central axis of the motor vehicle such that their centrifugal brakes 16 face the corresponding vehicle wheels. Each of the two rear wheels 39, 40 is therefore driven separately from the direction of the front axle 1 as soon as it exhibits a rotational speed difference with respect to the front axle 1. For this purpose, the bevel gear 21, on the right-hand side in FIG. 2, is equipped with a journal 22 that is torsionally fixed in the inlet sun gear wheel 7 of the right planetary gear 8.

The drive in the direction of the left-hand side takes place via a hollow shaft 23 that is flanged onto the bevel gear 21 and in a torsionally fixed way is locked in the inlet sun gear wheel 7 of the left planetary transmission 8. An output shaft 24 is disposed centrally in the hollow shaft 23 at which a wheel flange 25 for the left rear wheel 40 is mounted. An identical output shaft 24 with the wheel flange 25 for the right rear wheel 39 is disposed centrally in the journal 22 of the bevel gear 21. The output shafts 24 are fastened by a serrated connection in the outlet sun gear wheels 9. Planetary wheels 14 engage with the sun gear wheels 7, 9 and are disposed on bearing bolts 26 of the planetary carriers 15. Two plates 27, 28 are disposed on both sides of the sun gear wheels 7, 9 on the output shafts 24, or the journal 22 and the hollow shaft 23, and serve as the planetary carrier 15. On the front ends of the bearing bolts 26, two diametrically opposite brake shoes 29, 30 equipped with braking surfaces are pivoted and axially secured by expanding rings. The brake shoes 29, 30 rotate with the planetary carriers, and by centrifugal force, are pressed against the brake rings 32 fastened in the housing caps 31. The housing caps 31 have a cylindrical shape that is easy to cast and from the left and the right, are flanged onto a T-shaped center housing 33 in a flush manner.

At the junction plane to the left housing cap 31, a bearing plate 34 is cast onto the center housing 33, this bearing plate 34 carrying the main bearing 35 for the hollow shaft 23. At the junction plane to the right housing cap 31, a bearing plate 36 is screwed on between it and the center housing 33, the main bearing 37 for the journal 22 of the bevel gear 21 being fastened in the bearing plate 36. For both main bearings 35, 37, tapered roller bearings are used. They are installed such that they absorb the axial thrust caused by the bevel gear angle drive 20, 21 when the drive shaft 6 coming from the front axle 1 rotates to the left and the right, the drive shaft 6, driving the bevel gear 20 via the clutch plate 18. The journal of the bevel gear 20, on one side, is disposed directly in the center housing 33, and on the other side, in a bearing sleeve 38 that is sealed and fitted into the center housing 33 and is flanged onto it on the front side.

The ratio of the front angle drive is 23:33; the bevel gear angle drive ratio to the rear axle is 33:22, and the through drive ratio of the planetary gear is 44:46, so that the product of the three ratios becomes equal to 1:1, and both rear wheels 39, 40 are designed to move synchronously with the wheels of the front axle 1. When there is a rotational speed difference between the front axle 1 and one of the rear wheels, the planetary carrier that rotates 22 times faster generates in the centrifugal brake assigned to this wheel, a braking moment that rises progressively with the rotational speed difference, for example, quadratically, which will be available as the driving torque for this power train.

Also, when there is a rotational speed difference between the two rear wheels 39, 40, the limited slip differential systems 17 generate braking moments and therefore create a limited transverse slip between the two rear wheels 39, 40. The limited slip differential systems 17 replace a conventional differential gear that can be limited with respect to slip by a brake, such as a multiple-disk brake. Because of the progressive characteristic curve of the limited slip differential systems 17, they are much better suited as a limited transverse slip means than visco-clutches used for this purpose with degressively extending characteristic torque-rotational speed curves.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. In an all-wheel drive for a motor vehicle, having a first axle that can be driven continuously by the vehicle engine or its gear shift transmission, an automatically operating limited slip differential system for bringing two vehicle wheels of a second axle into driving connection with said first axle, said limited slip differential system having a planetary transmission formed of sun gear wheels, planetary wheels and a planetary carrier, and having a through drive ratio which only slightly deviates from 1:1, and a braking device that is applied to the planetary transmission at a high ratio, wherein two limited slip differential systems are arranged at the second axle, one limited slip differential system being assigned to the right vehicle wheel, and one limited slip differential system being assigned to the left vehicle wheel, and wherein the planetary transmission of each limited slip differential system includes:

an inlet sun gear wheel;

an outlet sun gear wheel having a slightly smaller number of teeth than said inlet sun gear wheel;

said outlet sun gear wheel being disposed coaxial and adjacent to said inlet sun gear wheel and connected with the vehicle wheel to be driven;

planetary wheels of a planetary carrier each engaging with the two sun gear wheels.

a braking device functioning between each planetary transmission and a fixed housing.

2. An all-wheel drive according to claim 1, further comprising:

drive shaft means extending in longitudinal direction of the vehicle; and angle drive means for jointly driving said limited slip differential systems, said angle drive means being driven by said drive shaft means.

3. An all-wheel drive according to claim 2, wherein the ratio of the inlet sun gear wheel to the planetary carrier is approximately 22:1.

4. An all-wheel drive according to claim 2, wherein the angle drive means comprises a bevel gear that is coaxial to the drive shaft, and a bevel gear that is coaxial to the second axle, the journal of said bevel gear being connected in a torsionally fixed manner with the inlet sun gear wheel of one of the planetary transmissions, whereas the inlet sun gear wheel of the other planetary transmission, in a torsionally fixed manner, being connected with the bevel gear via a shaft centrally fastened in it.

5. An all-wheel drive according to claim 4, wherein the fixed housing comprises:

housing caps for enclosing each limited slip differential system; and a center housing for enclosing the angle drive means; said housing caps being flanged onto said center housing.

6. An all-wheel drive according to claim 5, further comprising a bearing plate for the hollow shaft cast on at the center housing at the junction plane to the left housing cap, and a bearing plate screwed on between the center housing and the right housing cap, the journal of the bevel gear being disposed in said bearing plate.

7. An all-wheel drive according to claim 4, wherein the ratio of the inlet sun gear wheel to the planetary carrier is approximately 22:1.

8. An all-wheel drive according to claim 1, wherein the braking device is a centrifugal brake having brake shoes which are pivotally carried at bearing bolts fastened at the planetary carriers.

9. An all-wheel drive according to claim 1, wherein the ratio of the inlet sun gear wheel to the planetary carrier is approximately 22:1.

* * * * *